United States Patent
Sinha

(10) Patent No.: US 12,234,152 B2
(45) Date of Patent: Feb. 25, 2025

(54) MECHANOCHEMICAL PROCESS TO PRODUCE EXFOLIATED NANOPARTICLES

(71) Applicant: Carbon Upcycling Technologies Inc., Calgary (CA)

(72) Inventor: Apoorva Sinha, Calgary (CA)

(73) Assignee: Carbon Upcycling Technologies Inc., Calgary (CA)

( * ) Notice: Subject to any disclaimer, the term of this patent is extended or adjusted under 35 U.S.C. 154(b) by 0 days.

(21) Appl. No.: 18/342,829

(22) Filed: Jun. 28, 2023

(65) Prior Publication Data
US 2023/0339761 A1    Oct. 26, 2023

Related U.S. Application Data

(62) Division of application No. 16/629,626, filed as application No. PCT/IB2018/055156 on Jul. 12, 2018, now Pat. No. 11,772,976.

(30) Foreign Application Priority Data

Jul. 13, 2017   (EP) .................................. 17181233

(51) Int. Cl.
 *C01B 32/19* (2017.01)
 *C01B 32/192* (2017.01)
 *C01B 32/198* (2017.01)
 *C08K 3/04* (2006.01)

(52) U.S. Cl.
 CPC .......... *C01B 32/198* (2017.08); *C01B 32/192* (2017.08); *C08K 3/042* (2017.05); *C01B 2204/32* (2013.01); *C01P 2002/88* (2013.01); *C01P 2004/53* (2013.01); *C01P 2004/61* (2013.01); *C01P 2004/62* (2013.01); *C01P 2004/64* (2013.01); *C08K 2201/005* (2013.01); *C08K 2201/006* (2013.01); *C08K 2201/011* (2013.01)

(58) Field of Classification Search
 None
 See application file for complete search history.

(56) References Cited

U.S. PATENT DOCUMENTS

| | | | |
|---|---|---|---|
| 8,865,113 B2 | 10/2014 | Shankman | |
| 2013/0102084 A1 | 4/2013 | Loh et al. | |
| 2014/0272199 A1 | 9/2014 | Lin et al. | |
| 2014/0370387 A1 | 12/2014 | Anguchamy et al. | |
| 2016/0009561 A1 | 1/2016 | Coleman et al. | |

FOREIGN PATENT DOCUMENTS

| | | | | |
|---|---|---|---|---|
| CN | 104763427 | * | 7/2015 | |
| CN | 107277960 | * | 10/2017 | |
| EP | 3050844 A1 | | 8/2016 | |
| KR | 2015116489 | * | 10/2015 | |
| WO | WO-2014138596 A1 | * | 9/2014 | ........... C01B 32/182 |
| WO | WO-2016018995 A1 | * | 2/2016 | ........... C01B 32/182 |

OTHER PUBLICATIONS

Asbury Carbons "Amorphous Graphite" 2024. (Year: 2024).*
Asbury Carbons "Structure and Bonding" 2024. (Year: 2024).*
Britannica, The Editors of Encyclopaedia. "carbon dioxide". Encyclopedia Britannica, Aug. 21, 2024, https://www.britannica.com/science/carbon-dioxide. Accessed Aug. 22, 2024. (Year: 2024).*
Temming, Maria "Inorganic" ScienceNewsExplores. 2022 (Year: 2022).*
Gao, Y., Shi, W., Wang, W., Wang, Y., Zhao, Y., Lei, Z. and Miao, R., 2014. Ultrasonic-assisted production of graphene with high yield in supercritical CO2 and its high electrical conductivity film. Industrial & Engineering Chemistry Research, 53(7), pp. 2839-2845.
Li, L., Xu, J., Li, G., Jia, X., Li, Y., Yang, F., Zhang, L., Xu, C., Gao, J., Liu, Y. and Fang, Z., 2016. Preparation of graphene nanosheets by shear-assisted supercritical CO2 exfoliation. Chemical Engineering Journal, 284, pp. 78-84.
McKelvy, M.J., Bearat, H., Chizmeshya, A.V., Nunez, R. and Carpenter, R.W., 2003. Understanding olivine CO2 mineral sequestration mechanisms at the atomic level: Optimizing reaction process design. Arizona State University (US).
Xu, S., Xu, Q., Wang, N., Chen, Z., Tian, Q., Yang, H. and Wang, K., 2015. Reverse-micelle-induced exfoliation of graphite into graphene nanosheets with assistance of supercritical CO2. Chemistry of Materials, 27(9), pp. 3262-3272.
Beckert, F., Bodendorfer, S., Zhang, W., Thomann, R. and Mulhaupt, R., 2014. Mechanochemical route to graphene-supported iron catalysts for olefin polymerization and in situ formation of carbon/polyolefin nanocomposites. Macromolecules, 47(20), pp. 7036-7042.

* cited by examiner

*Primary Examiner* — Sheng H Davis
(74) *Attorney, Agent, or Firm* — N.V. Nederlandsch Octrooibureau

(57) ABSTRACT

The invention relates to a mechanochemical process to produce exfoliated nanoparticles comprising the steps of providing a solid feedstock comprising a carbonaceous and/or mineral-based material; providing a flow of an oxidizing gas; introducing the solid feedstock and the flow of an oxidizing gas into a mechanical agitation unit, subjecting the material of the solid feedstock in the presence of the oxidizing gas to a mechanical agitation operation in the mechanical agitation unit at a pressure of at least 1 atm (15 psi). The invention further relates to nanoparticles obtainable by the mechanochemical process and to the use of such nanoparticles.

11 Claims, 8 Drawing Sheets

C

D

MECHANOCHEMICAL PROCESS TO PRODUCE EXFOLIATED NANOPARTICLES

FIELD OF THE INVENTION

The present invention relates to a mechanochemical process to produce exfoliated nanoparticles. The invention further relates to the nanoparticles obtainable by this mechanochemical process and to the use of the nanoparticles.

BACKGROUND ART

During recent years graphene and graphitic nanoplatelets emerged as a very promising material because of its unique combination of properties, opening a way for their exploration in a wide spectrum of applications.

Presently known methods to produce graphene comprise techniques based on chemical cleavage or mechanical cleavage, chemical vapour deposition techniques, epitaxial growth methods, liquid phase exfoliation techniques.

Some of these techniques use toxic chemicals or create hazardous waste or poisonous gases and can therefore not be considered as valuable techniques to produce graphene.

Furthermore it remains challenging to find a method that allows the upscaling of graphene production resulting in high quality graphene, produced at reasonable costs and in a reproducible manner.

Therefore, there is a need to provide an improved method to provide graphene, nanoplatelets and graphitic nanoplatelets.

SUMMARY OF THE INVENTION

It is an object of the present invention to provide a method to produce exfoliated nanoparticles, as for example exfoliated graphene nanoparticles.

It is another object to provide a method to produce exfoliated nanoparticles that can be upscaled.

It is a further object of the invention to provide a method that does not require toxic chemicals.

Furthermore it is an object of the invention to provide a method that allows to sequester carbon dioxide ($CO_2$), for example from $CO_2$ emissions, in a stable solid form that is suitable in a number of different applications.

It is still a further object of the invention to create nanoparticles using waste $CO_2$ and cheap solid feedstock.

According to a first aspect of the present invention, a mechanochemical process to produce exfoliated nanoparticles is provided. The process comprises the steps of
  providing a solid feedstock comprising a carbonaceous and/or mineral based material,
  providing a flow of an oxidizing gas, as for example a flow of carbon dioxide,
  introducing the solid feedstock and the flow of an oxidizing gas into a mechanical agitation unit,
  subjecting the solid feedstock in the presence of the oxidizing gas to a mechanical agitation operation in the mechanical agitation unit at a pressure higher than 1 atm (15 psi).

In particular, the process according to the present invention allows to upcycle emissions, such as $CO_2$ emission and solid feedstock, such as carbonaceous feedstock to produce nanoparticles as for example graphene nanoparticles.

According to a second aspect of the present invention, nanoparticles obtainable by the above described mechanochemical process are provided. It has been established by the present inventors have, in various respects, superior properties over existing materials. Accordingly the nanoparticles of the present invention confer significant benefits in a large variety of applications.

According to a third aspect of the present invention, the use of nanoparticles obtainable by the above described mechanochemical process is provided.

BRIEF DESCRIPTION OF THE DRAWINGS

The present invention will be discussed in more detail below, with reference to the attached drawings in which.

DESCRIPTION OF EMBODIMENTS

Figure 1:
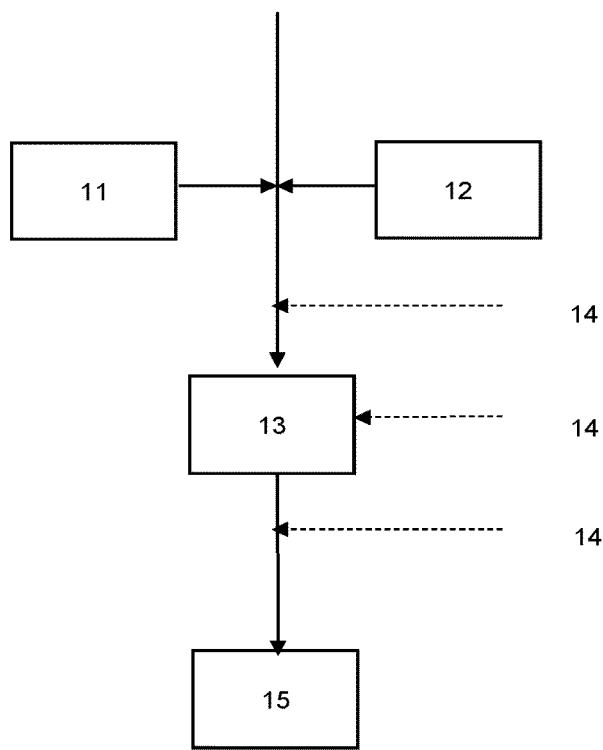
FIG. 1 depicts a flowchart of a method according to the present invention.

The process according to the present invention to produce exfoliated nanoparticles is illustrated in FIG. 1.

A solid feedstock 11 and a flow of oxidizing gas 12 are introduced in a mechanical agitation unit 13. The material of the solid feedstock 11 is in the presence of the oxidizing gas subjected to a mechanical agitation operation in the mechanical agitation unit 13 at a pressure of at least 1 atm (15 psi). More preferably, the mechanical agitation unit 13 is pressurized at a pressure of at least 2 atm (29.4 psi).

For the purpose of the present invention a carbonaceous material is defined as a material comprising carbon or carbon compounds. Examples of a feedstock comprising a carbonaceous material comprise fly ash, bottom ash (incinerator ash), graphite, petroleum coke, anthracite coal, bituminous coal, activated carbon, charcoal, or combinations thereof.

For the purpose of the present invention a mineral-based material comprises inorganic materials as for examples oxides and silicates. Examples of a feedstock comprising an inorganic material comprise olivine, talc, yellowstone, serpentine, saw dust or amorphous powder or combinations thereof.

In accordance with the invention, the process can be performed simply by treating the feedstock in a solid, dry state. Hence in accordance with embodiments of the invention, a process as defined herein is provided, wherein the solid feedstock comprises less than 10% of water, based on the total weight of the feedstock, e.g. less than 8%, less than 6%, less than 5%, less than 4%, less than 3%, less than 2%, less than 1%, less than 0.5% or less than 0.1%. In accordance with embodiments of the invention, a process as defined herein is provided, wherein the process does not comprise any step wherein substantial amounts of water or solvent are added to the feedstock. In preferred embodiments of the invention, no water or solvent is added to the feedstock at all. In other embodiments of the invention, less than 10% of water and/or solvent are added, based on the total weight of the feedstock, e.g. less than 8%, less than 6%, less than 5%, less than 4%, less than 3%, less than 2%, less than 1%, less than 0.5% or less than 0.1%.

The flow of oxidizing gas may comprise any type of oxidizing gas as for example oxygen, sulfur dioxide, nitrogen dioxide and carbon dioxide. A preferred oxidizing gas comprises carbon dioxide ($CO_2$). The carbon dioxide may for example comprise carbon dioxide ($CO_2$) emissions from burning of fossil fuels like coal, gas or oil, or carbon dioxide emissions from industrial processes such as cement manufacturing.

One of the advantages of the present invention, compared to processes known in the art, resides in the fact that the process can be performed with oxidizing gas, such as carbon dioxide gas, of relatively low purity. It is feasible, example, to use carbon dioxide gas emissions derived from industrial processes, i.e. as a waste or side stream. Hence in preferred embodiments of the invention, processes as defined herein are provided wherein a gas is used that is relatively impure, e.g. a gas comprising carbon dioxide at a level within the range of 70-95%, e.g. 70-90%, 70-85%, 75-95%, 75-90%, 75-85%, 80-95% or 80-90%.

A further advantage of the present invention, compared to processes known in the art, resides in the fact that the process does not require the oxidizing gas to be in a supercritical state. Hence, the solid feedstock can be treated with the oxidizing gas without having to apply pressures and temperatures high enough to bring and/or keep the oxidizing gas in a supercritical state. Hence, in accordance with the invention, a process is provided as defined herein, wherein the oxidizing gas is in a gaseous state, as will be evident from the general description of the process and the specific process conditions as well as from the appending examples. In accordance with the invention, the oxidizing gas is typically not in the supercritical state.

For the purpose of this invention the mechanical agitation operation may comprise any method to apply kinetic energy to the solid feedstock to facilitate the interaction with the flow of the oxidizing gas. Examples of mechanical agitation include mixing, stirring, shearing, shaking, blending, ultrasonication and combinations thereof. Examples of shearing comprise low-torque or high torque shearing. Examples of stirring comprise low speed or high speed stirring, centrifuging or sonication.

A particular advantage of the present invention, compared to processes known in the art, resides in the fact that the kinetic energy required to successfully carry out the process is relatively low. Hence in preferred embodiments of the invention, processes as defined herein are provided wherein the kinetic energy applied is less than 5 MW per ton of end product produced, preferably less than 4 MW per ton, more preferably 3 MW per ton.

It can be preferred to add a catalyst to the solid feedstock. Preferred catalysts comprise metal oxides, as for example iron oxides, cobalt oxides, rhenium oxides, titanium oxides and combinations thereof. The catalyst can be added through a lining for example a lining on the inside wall of the mechanical agitation unit or on a component of the mechanical agitation unit. The lining comprises for example a sputtered lining. Alternatively, the catalyst can be added through solution mixing with the material of the feedstock.

In preferred mechanochemical processes according to the present invention an intercalant agent is added during the process. Preferred intercalant agents comprises acids such as hydrochloric acid, sulfuric acid or nitric acid.

The intercalant agent can be added before, during or after the mechanical agitation operation of the material of the solid feedstock.

Preferably, the mechanical agitation unit is pressurized at a pressure of at least 1 atm (15 psi). More preferably, the mechanical agitation unit is pressurized at a pressure of at least 2 atm (29.4 psi).

The nanoparticles obtainable by the mechanochemical process according to the present invention may comprise nanosheets, nanoparticles or nanoplatelets.

The nanoparticles preferably have a BET surface ranging between 10 $m^2$ per gram and 1000 $m^2$ per gram, more preferably between 50 $m^2$ per gram and 1000 $m^2$ per gram as for example 100 $m^2$ per gram, 200 $m^2$ per gram, 300 $m^2$ per gram, 500 $m^2$ per gram, 600 $m^2$ per gram, 700 $m^2$ per gram, 800 $m^2$ per gram, 900 $m^2$ per gram or 950 $m^2$ per gram.

The nanoparticles have preferably a D50 particle size distribution ranging between 20 nm and 10 µm and more preferably between 50 µm and 5 µm as for example 100 nm, 200 nm, 300 nm, 500 nm, 1 µm, 2 µm or 3 µm. The D50 particle size distribution is defined as the median diameter or the medium value of the particle size distribution, it is the value of the particle diameter (or the particle equivalent diameter) at 50% in the cumulative distribution.

The nanoparticles obtainable by the mechanochemical process according to the present invention may have a bimodal distribution with a first set of nanoparticles and a second set of nanoparticles. The first set of nanoparticles has preferably a particle size ranging between 50 nm and 300 nm and more preferably between 100 nm and 300 nm, whereas the second set of nanoparticles preferably has a particle size ranging between nm 1 µm and 10 µm and more preferably between 1 µm and 5 µm. The bimodal distribution is achieved through the optimal use of the catalysts utilized in the exfoliation process.

In embodiments of the invention the nanoparticles obtainable by the mechanochemical process have a bimodal distribution with a first set of nanoparticles having a D50 within the range between 50 nm and 300 nm and more preferably within the range of 100 nm and 300 nm, and a second set of nanoparticles having a D50 within the range of 1 µm and 10 µm and more preferably within the range of 1 µm and 5 µm.

In preferred embodiments of the invention, particle size characteristics, such as D50 values, are determined using a dynamic light scattering method with an ethanol dispersion of between 0.1 and 5 mg/mL concentration.

In case the solid feedstock comprises a carbonaceous feedstock, the nanoparticles obtainable by the above described mechanochemical process have preferably a C/O ratio ranging between 1 and 40, for example a C/O ratio of 5, 10, 20, 25, 30 or 35.

The nanoparticles obtainable by the above described mechanochemical process preferably show a release of $CO_2$ ranging between 5 and 35 wt % of the mass of the nanoparticles. The $CO_2$ is released by exposing the nanoparticles to elevated temperatures. $CO_2$ release is initiated at a temperature between 180 and 200° C. for carbonaceous feedstock and at a temperature of 600° C. for mineral-based feedstock and continues to increase as the ambient temperature is raised. The $CO_2$ release can be tuned based on the temperature. For carbonaceous feedstock, only 20% of the entrained $CO_2$ is released before 300° C. in optimized production, and 100% of the $CO_2$ is released when the temperature is raised to 600° C. For mineral-based feedstock, the product releases 100% of the entrained $CO_2$ by 800° C.

The nanoparticles obtainable by the above described mechanochemical process are suitable to be used as additive, for example as additive to polymer materials. The nanoparticles can be used as an additive for thermosetting materials, for example epoxies or as an additive for thermoplastic materials, for example polyethylene, in particular high density polyethylene (HDPE), low density polyethylene (LDPE), linear low density polyethylene (LLDPE), medium density polyethylene (MDPE), polypropylene, thermoplastic polyurethane, polyamides such as nylon 6 or nylon 6 6. The nanoparticles are also suitable to be added to biodegradable polymer materials such as polyhydroxyalkanoate (PHA) or polylactic acid (PLA). By adding nanoparticles to the polymer material, the properties of the polymer material may be influenced. The nanoparticles can for example be added to amend one or more of the following properties:

- to increase the tensile strength and/or the tensile modulus of the base resin of the polymer material,
- to increase the UV-resistance of the base resin of the polymer material,
- to increase the crystallization temperature of the base resin of the polymer material,
- to increase the coefficient of friction of the base resin of the polymer material,
- to influence the surface properties of the base resin of the polymer material and thus the behaviour of the polymer material in wet service in water or other fluids, for example by influencing the hydrophilicity of the surface of the base resin of the polymer material,
- to influence the thermal conductivity of the base resin of the polymer material,
- to produce a nanocomposite with potential for dew nucleation, promotion of vapour condensation, and air filtration of moisture,
- to decrease the gas permeability of a gas, for example to decrease the gas permeability of methane, ethane, hydrogen or oxygen.

The nanoparticles can for example be added in a concentration ranging between 0.05 wt % and 10 wt %.

The nanoparticles obtainable by the above described mechanochemical process are also suitable as additive to a coating, such as polymer coatings, metal coatings, epoxy coatings or inorganic coatings. The nanoparticles can be added to influence properties of the coating such as the corrosion resistance or lubricity of the coating. The nanoparticles can for example be dispersed effectively in ceramic chemistries, such as magnesium oxide coatings for nano-level crosslinking, better lubricity, and higher corrosion resistance particularly at elevated temperatures.

The nanoparticles obtainable by the present invention can be added to adhesives, for example polyurethane-based adhesives. By adding nanoparticles according to the present invention to adhesives as for example polyurethane-based coating the lap shear strength and the pull-off strength may be increased. The lap shear strength may be doubled and the pull-off strength may be increased with for example by 30%.

Nanoparticles can be used as additive in inks, as for example conductive inks such as conductive inks for printed electronics.

The nanoparticles are furthermore suitable as additive in cementitious materials. By adding the nanoparticles to cementitious materials the micro- and macro-properties of cementitious material can be influenced. Addition of nanoparticles to cementitious materials as for example mortar may enhance the compressive strength. Furthermore addition of nanoparticles according to the present invention may decelerate the chemical attack for example induced by an acidic solution and may improve the corrosion resistance of cementitious material. Furthermore the addition of nanoparticles such as graphene nanoparticles or graphene oxide nanoparticles may promote the interfacial bond between the nanoparticles and the carbon silicate hydrate gels (C-S-H gels) around them. Furthermore by adding nanoparticles to asphalt cement, the properties such as the freeze thaw resistance of the asphalt mix can be improved.

Nanoparticles according to the present invention can be added to membranes, for example polymer membranes or can be added to a coating applied on membranes. In particular nanoparticles can be added as additive in a polymeric membrane for example to enhance ion rejection, water reflux and compression strength of the membrane. In particular nanoparticles Polymer membranes are suitable as separation or filtration membrane in particular as nanofiltration membrane. In particular graphene oxide membranes or graphene oxide coated membranes are suitable as nanofiltration membrane. Graphene oxide coated polymer membranes comprise for example polymer membranes such as polyvinylidene fluoride (PVDF), polyvinyl acetate (PVA) or polyamide (Nylon) membranes. The nanoparticles can also be applied to ceramic and inorganic membranes, for example through solution processing or a post-production coating process.

Nanoparticles according to the present invention can be used in biomedical applications as for example as in the examples mentioned below:

- Peptide-functionalized graphene with long time dispersion stability in aqueous solutions as a platform to load cancer drugs and/or RNA for therapeutic applications,
- Graphene oxide/peptide functional complexes as a platform to load both cancer drug and RNA,
- Graphene oxide based scaffold to grow cells, and to study their biocompatibility,
- Identification of protein corona around graphene particles in biological environment to detect cancer cells' receptors, and use targeted delivery of antibodies.

The nanoparticles according to the present invention can furthermore be used for energy storage for example in batteries as for example mentioned in the examples below:

- Graphene nanoparticles, in particular conductive graphene nanoparticles can be used as an additive to the cathodes and anodes of aqueous and non-aqueous lithium battery systems;
- Graphene nanoparticles or graphene coating can be applied on the surface of electrodes to suppress the dissolution of active materials and/or to reduce the nucleation sites of dendrites in the cathode and anode, respectively of the aqueous and non-aqueous lithium battery system,
- Graphene oxide films can be applied on the separators to strengthen their resistance against dendrite propagation form the anode towards the cathode,
- Conductive current collectors comprising graphene films can be used to reduce the size and weight of the final batteries. Conductive current comprising graphene films can replace the commercial current collectors comprising thick pieces of graphite paper or comprising conductive polymer films.

In addition the nanoparticles are suitable as graphene-based dye sensitized solar cells, in energy storage devices.

Furthermore the nanoparticles are suitable for graphene-based amphiphilic carbon nanosheets for tertiary or enhanced oil recovery.

The nanoparticles obtainable by the method according to the present invention are also suitable to provide quantum dots for example metallic quantum dots to improve the p-n junctions or to provide graphene quantum dots to be used in the next generation of solar cells having reduced costs in comparison with metal based quantum dots or to provide white-light-emitting graphene quantum dots or UV-absorbing graphene quantum dots. The dots could also be utilized in light-emitting screens such as televisions and computer screens.

Nanoparticles according to the present invention can be used in metal and polymer cold spraying applications for consistency in ultrasonic, supersonic, or conventional cold spraying techniques for pinhole free deposition and consistent coating deposition on the surface.

Furthermore nanoparticles according to the present invention can be used as adsorbents or absorbents, for example as adsorbents in mining applications such as gold cyanidation for the leeching of gold cyanide particles from the stripping solution or as absorbent in oil spill recovery to absorb oil floating on water.

Nanoparticles obtainable by the mechanochemical process of the present invention can furthermore be suitable as transparent, conductive or anti-reflection film or coating on substrates as for example on metal or non-metal substrates. In particular the nanoparticles are suitable as transparent, flexible conductive film for displays and electrodes.

EXAMPLES

In a first example, a sample of graphite was sonicated in a chamber using a low-power ultrasonic probe (100 W, 30 kHz frequency) for promoting the exfoliation of the feedstock in the presence of an iron oxide catalyst and a surfactant used for dispersion. The chamber was enclosed with a positive pressure of $CO_2$.

In a second example an ultrasonic bath (40 kHz) was used to agitate the material of the solid feedstock (for example graphite) in the presence of a surfactant and cobalt(II)oxide as catalyst to promote the exfoliation of the graphene sheets. The chamber was enclosed with a positive pressure of $CO_2$.

In a further example, a bulk mixing method was used in which the solid feedstock (graphite) was mixed at a positive pressure of $CO_2$ in the presence of a surfactant and rhenium oxide as catalyst to promote the generation of a bimodal distribution of the nanoparticles. One set of nanoparticles has a particle size ranging between 50 nm and 300 nm and the other set of nanoparticles has a particle size between 1 μm and 10 μm.

In another example, a high-power sonication method was used in which the solid feedstock (olivine) was mixed at a positive pressure of $CO_2$ in the presence of a surfactant and cobalt oxide as catalyst to promote the generation of a bimodal distribution of the nanoparticles. One set of nanoparticles has a particle size ranging between 50 nm and 600 nm and the other set of nanoparticles has a particle size between 1 μm and 15 μm.

In a further example, a low-power mixing method was used in which the solid feedstock (graphite) was mixed at a positive pressure of $CO_2$ in the presence of a surfactant and iron oxide as catalyst to promote the generation of a bimodal distribution of nanoparticles. One set of nanoparticles has a particle size ranging between 20 nm and 250 nm and the other set of nanoparticles has a particle size between 0.8 μm and 7 μm.

Addition of Nanoparticles to Polymer Material

The effectiveness of the addition of nanoparticles in particular of GNP (graphene nanoplatelets) and GO (graphene oxide) as fillers in a polymer material as for example melt compounded high density polyethylene (HDPE) is illustrated below. HDPE with the addition of GNP is referred to as HDPE-GNP, HDPE with the addition of GO is referred to as HDPE-GO.

The GNP filler is obtained by the process according to the present invention. The GO filler was synthetized from the same GNP using a modified Hummers method. HDPE was of grade HD 6908 (ExxonMobil), a homopolymer with a density of 0.965 g/cm³ and a melt index of 8.2 g/10 min (ASTM D1238, 190° C./2.16 kg). The VTMS (vinyltrimethoxysilane) compatibilizer used for the HDPE-GNP composites was supplied by Evonik Industries, while the maleated polyethylene (MAPE) compatibilizer used for the HDPE-GO composites was Epolene C-26.

The fillers were mixed with the HDPE matrix with the appropriate compatibilizing agents and melt blended. Melt processing was performed with a co-rotating twin screw compounder (DSM Xplore 15 mL). Matrix and filler materials were first measured and transferred into centrifuge tubes. In the case of the HDPE-GNP composites, the chosen weight fractions were 0.1, 0.5, 1.5, 5, 7, and 10 wt % GNP in HDPE. In case of HDPE-GO composites, lower weight fractions of 0.05, 0.1, 0.25, 0.5, and 1.5 wt % GO in HDPE were used. Next, an appropriate amount of compatibilizer was added to the mix. For the HDPE-GNP composites, 0.5 wt % VTMS (relative to HDPE) was added to the centrifuge tubes via micropipette, and vigorously shaken manually. In the HDPE-GO blends, 25 wt % MAPE (relative to GO) in pellet form was used.

These mixes were then fed into the compounder operating at 185° C. and 150 rpm for melt blending. The compounder was running for 8 minutes to ensure good dispersion. After melting, the blends were directly transferred over to a 5.5 mL micro-injection mould (DSM Xplore) to fabricate samples for mechanical testing. A barrel temperature of 185° C. and mould temperature of 45° C. were used for all samples. The melt was injected and held with a pressure of 110 bar for 1 minute. Excess plastic material from the fabricated samples was trimmed off and used as samples for differential scanning calorimetry (DSC).

The samples were characterized in terms of morphological, tensile, dynamic mechanical and thermal properties by the tests described below to determine the effectiveness of the fillers.

Morphology

Morphological characterization of the HDPE-GNP and HDPE-GO composites was performed through scanning electron microscopy (SEM) with the Quanta FEG 250 ESEM (FEI). Clean cross sections for imaging were produced through liquid nitrogen fracturing, followed by sputter coating with platinum to prevent charge accumulation during SEM imaging. SEM micrographs for the HDPE-GNE and HDPE-GO composites allow to see the degree of dispersion of the fillers in the polymer matrix and allow to detect agglomerates.

SEM micrographs for the HDPE-GNP composites show that the GNP filler was well-dispersed in the 10 wt % composition, though many regions saw significant agglomeration between the platelets because of the van der Waals forces acting between them. For HDPE-GNP composites with 10 wt % GNP the multi-plate structures are clearly visible, with total thicknesses of several hundred nm. Plate diameters vary between well-dispersed regions and regions of notable agglomeration. Agglomeration was not observed in the HDPE-GNP composite with 0.1% wt % GNP, where no large plates could be found.

Compared to the HDPE-GNP composites, the HDPE-GO composites saw much greater agglomeration despite lower filler weight percentages being used. As the supplied GO is expected to be under 500 nm in lateral size, agglomerates with lengths exceeding 10 μm indicates poor dispersion.

This can be attributed to the fact that GO tends to be hydrophilic in nature, leading to a mismatch with the highly hydrophobic polyethylene matrix. Though the agglomerates are distributed uniformly, the melt processing used was unable to disperse the individual GO platelets. Through visual inspection, the agglomerates present in the 0.25 wt % GO HDPE-GO composites were typically smaller than those found in the 1.5 wt % GO HDPE-GO composites.

Mechanical Properties

The mechanical properties of the composites were tested through both uniaxial tensile testing and dynamic mechanical testing (DMA). Tensile testing was performed with the Microtester 5848 (Instron), in accordance with ASTM D638. The injection-moulded dogbone samples were of Type IV, as specified by the ASTM standard. Samples were then loaded in uniaxial tension at a rate of 50 mm/min until either failure, or the machine reached its physical limit. Seven samples were tested for each composition, from which their Young's modulus, peak stress, modulus of resilience, and elongation strains at break were calculated and analyzed. DMA testing was conducted with the DMA Q800 (TA Instruments), in which the thin rectangular beam samples were loaded into a dual-cantilever fixture and subjected to a cyclic three-point-bending test. Samples were tested with a linear frequency sweep from 0 to 60 Hz at three different oscillation amplitudes (30, 60 and 120 µm) at 35° C. From this testing, their storage moduli, loss moduli, and loss tangents could be obtained.

Figure 2:
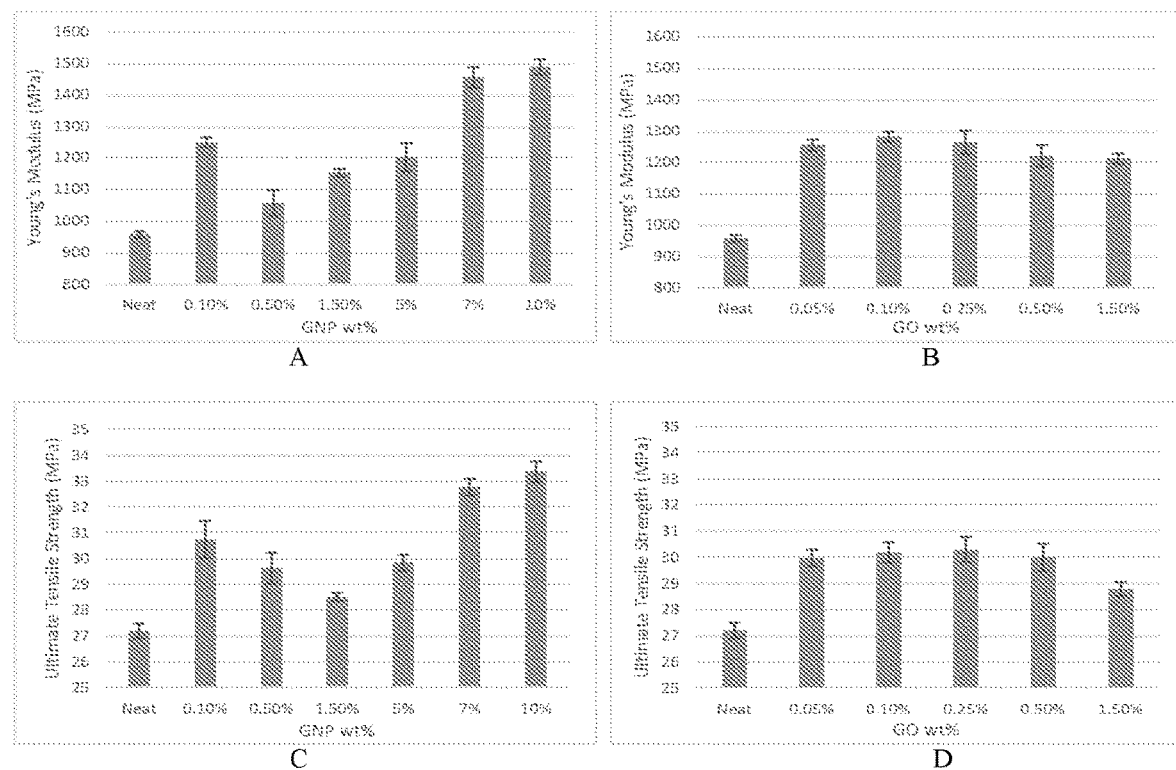
FIG. 2 shows the Young's modulus (A and B), peak stress (C and D), resilience (E and F) and maximum elongation (G and F) for HDPE-GNP and HDPE-GO composites.
Figure 2:
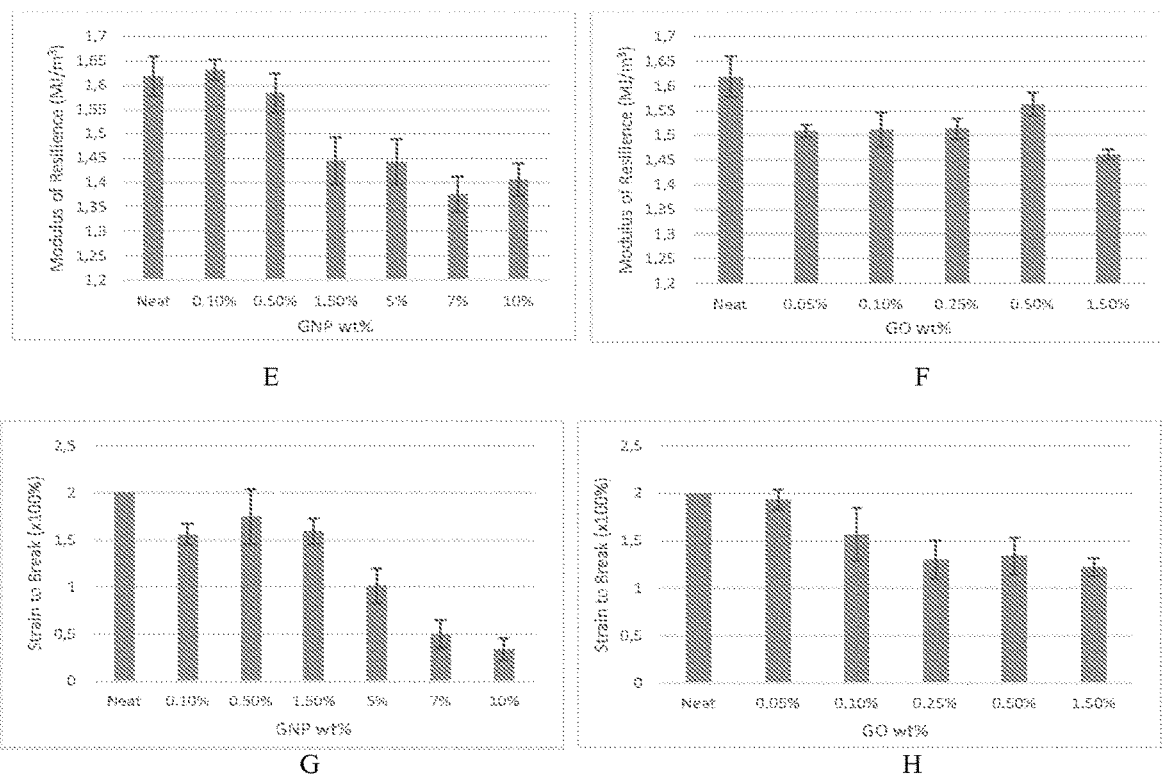

The tensile properties of the HDPE-GNP and HDPE-GO composites are shown in FIG. 2: A and B show the Young's modulus of respectively HDPE-GNP and HDPE-GO composites with different concentration of GNP and GO, C and D show the peak stress of respectively HDPE-GNP and HDPE-GO composites with different concentration of GNP and GO, E and F show the resilience of respectively HDPE-GNP and HDPE-GO composites with different concentration of GNP and GO, and G and H show the maximum elongation of respectively HDPE-GNP and HDPE-GO composites with different concentration of GNP and GO.

Tensile testing showed notable improvements in Young's modulus for both the HDPE-GNP and HDPE-GO composites, despite significant agglomeration in the higher loadings as evidenced by the SEM imaging. The maximum measured Young's modulus occurred in the 10 wt % GNP HDPE-GNP composite, in which the increase in Young's modulus over neat HDPE was over 55%. A smaller increase of 22% in the peak stress was also seen.

In the case of HDPE-GNP composites, a general upward trend in elastic modulus and peak stress is observed with increasing filler loading. However, 0.1 wt % GNP loading marks a peak for Young's modulus and maximum stress, which is followed by local minima for modulus and strength at 0.5 wt % and 1.5 wt %, respectively. This suggests that the total degree of reinforcement is dependent on multiple factors. More specifically, at very low GNP loadings, dispersion is excellent and agglomeration is not an issue, resulting in the good reinforcement seen at 0.1 wt % loading. With increasing GNP loading, the amount of agglomeration will increase, leading to less effective reinforcement despite the greater abundance of reinforcing fillers. This was reflected in the drop in Young's modulus from 0.1 wt % to 0.5 wt %, and a similar decrease in peak stress from 0.1% to 1.5%. Increasing filler loading further, the agglomeration sizes will reach a limit due to the shear present in the compounder, and thus the filler quantity becomes the dominant variable, which would resume the positive trend in both modulus and tensile strength. In terms of strain to break, the HDPE-GNP composites saw a marked decrease with greater filler loading. It should be noted that the neat HDPE specimens were extended until around 200% elongation, reaching the mechanical limit of the machine before breaking. The modulus of resilience was calculated by integrating the stress-strain curves from zero strain until peak stress, ignoring the latter plateau in the curves. For the HDPE-GNP composites, the lower loadings exhibited resilience comparable to that of neat HDPE, while the higher loadings demonstrated progressively lower resilience, owing to the reduction in material compliance with increasing filler loading.

The HDPE-GO composites exhibited less prominent trends, due to the narrower range of loadings tested. Nonetheless, an increase in both modulus and peak stress over all the loadings as compared with neat HDPE was observed. The most noticeable increase in the modulus and peak was from neat HDPE to 0.05 wt %, showing 31.6% and 10% increases respectively. Between 0.05 wt % GO and the subsequent three loadings, modulus and peak stress values were all measured to be within one standard deviation of each other, indicating an asymptote origin at around 0.05 wt % respectively. As seen from the SEM images, the GO particles within the HDPE matrix demonstrated significant agglomeration at all weight contents. It is believed that the addition of 0.05 wt % increased the properties by promoting the required shear transfer to the fillers. However, increasing the filler content results also in increase in the agglomerate sizes resulting in a competition between reinforcing role of the fillers and the loss in load bearing due the increase in the agglomerate sizes. The strain at break shows a decreasing trend with increasing filler content.

Figure 3:
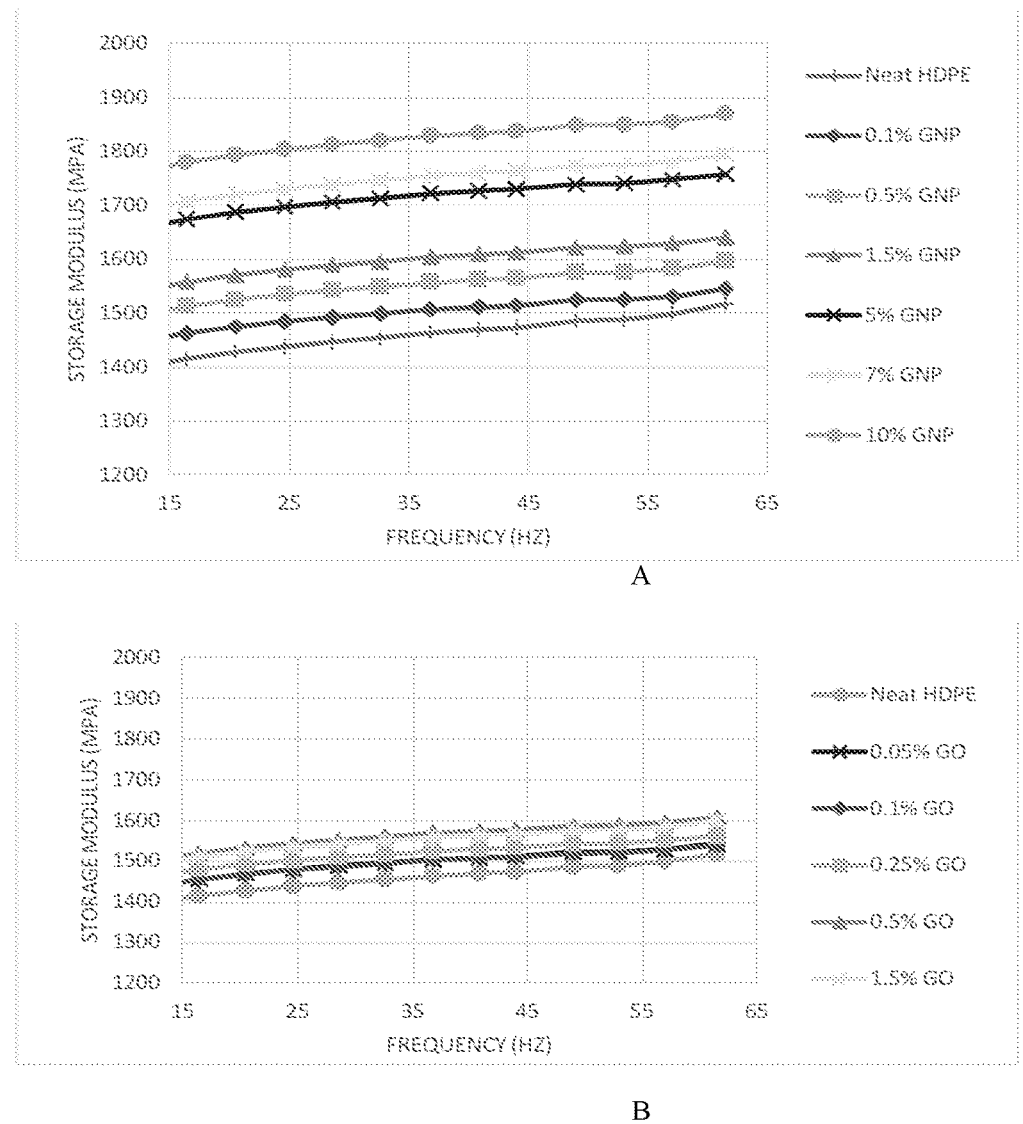
FIG. 3 shows the storage modulus (A and B), loss modulus (C and D), loss tangent (E and F) for HDPE-GNP and HDPE-GO composites.
Figure 3:
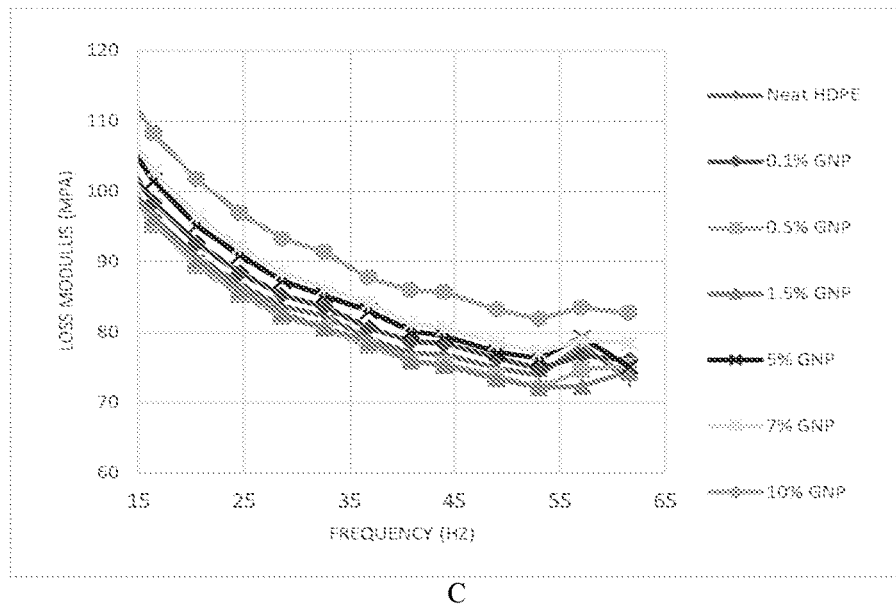
Figure 3:
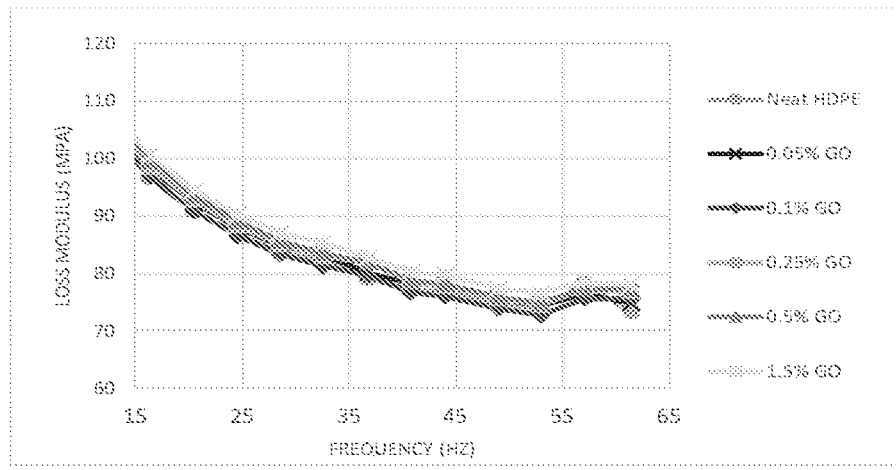
Figure 3:
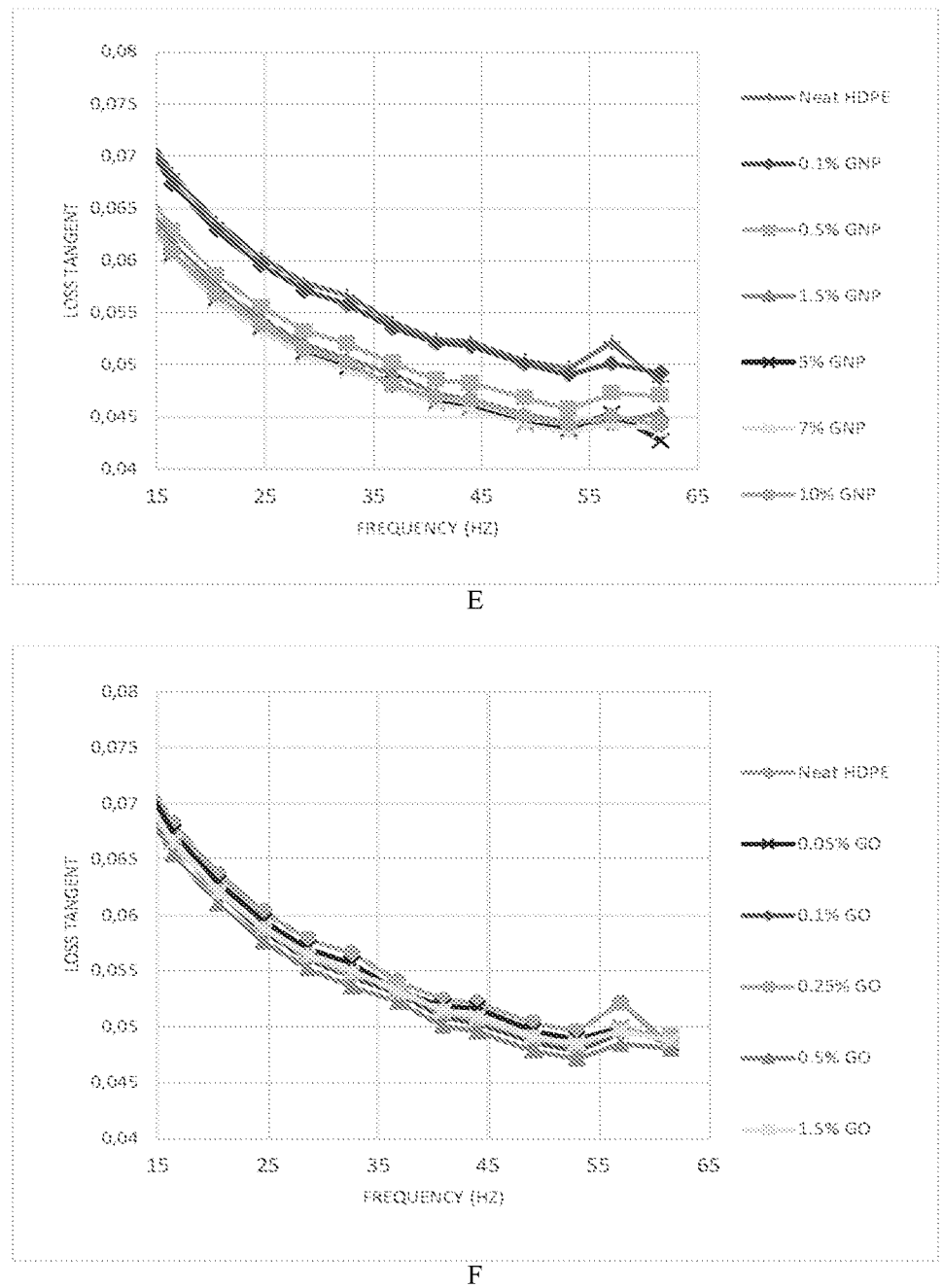

The dynamic mechanical characteristics of the HDPE-GNP and HDPE-GO composites are presented in FIG. 3: A and B show the storage modulus of respectively HDPE-GNP and HDPE-GO composites with different concentrations of GNP and GO, C and D show the loss modulus of respectively HDPE-GNP and HDPE-GO composites with different concentrations of GNP and GO, E and F show the loss tangent of respectively HDPE-GNP and HDPE-GO composites with different concentrations of GNP and GO.

For both HDPE-GNP and HDPE-GO composites, an increase in storage modulus is generally observed with increasing filler loading. These measurements match closely with the elastic modulus results obtained from tensile testing. Examining loss modulus, values increased with greater filler loading as the resulting increase in stiffness inherently leads to a higher effective viscosity in the material, according to the Kelvin-Voigt model [33]. Examining loss tangent, the lowest amount of viscoelastic losses was perceived in neat HDPE and generally increased with higher filler loadings. This may be attributed to the relatively weak interfacial bonding between filler and matrix, which will act as frictional dissipation mechanisms through stick-slip motion between filler and matrix. Frictional losses would also be more prevalent in composites with higher filler loadings where agglomeration is more widespread, in which the weak filler-filler interactions will introduce additional degrees of freedom for sliding and rotation in the composite in addition to those present in the filler-matrix interfaces. These dissipative forces would in turn be measured as further viscous losses. In all cases, the loss tangent was extremely low, indicating that the HDPE matrix is not well-suited for damping applications.

Thermal Properties

The crystallization and melting characteristics of the two composites were determined through differential scanning calorimetry (DSC). Specifically, the DSC Q2000 (TA Instruments) was utilized, running composite samples through a heat-cool-heat cycle from ambient room temperature (22° C.) to 180° C., down to −40° C., and back to 180° C., all at a rate of 10° C./min. Samples consisted of thin slices of composite ranging from 10-12 mg in mass.

Figure 4:
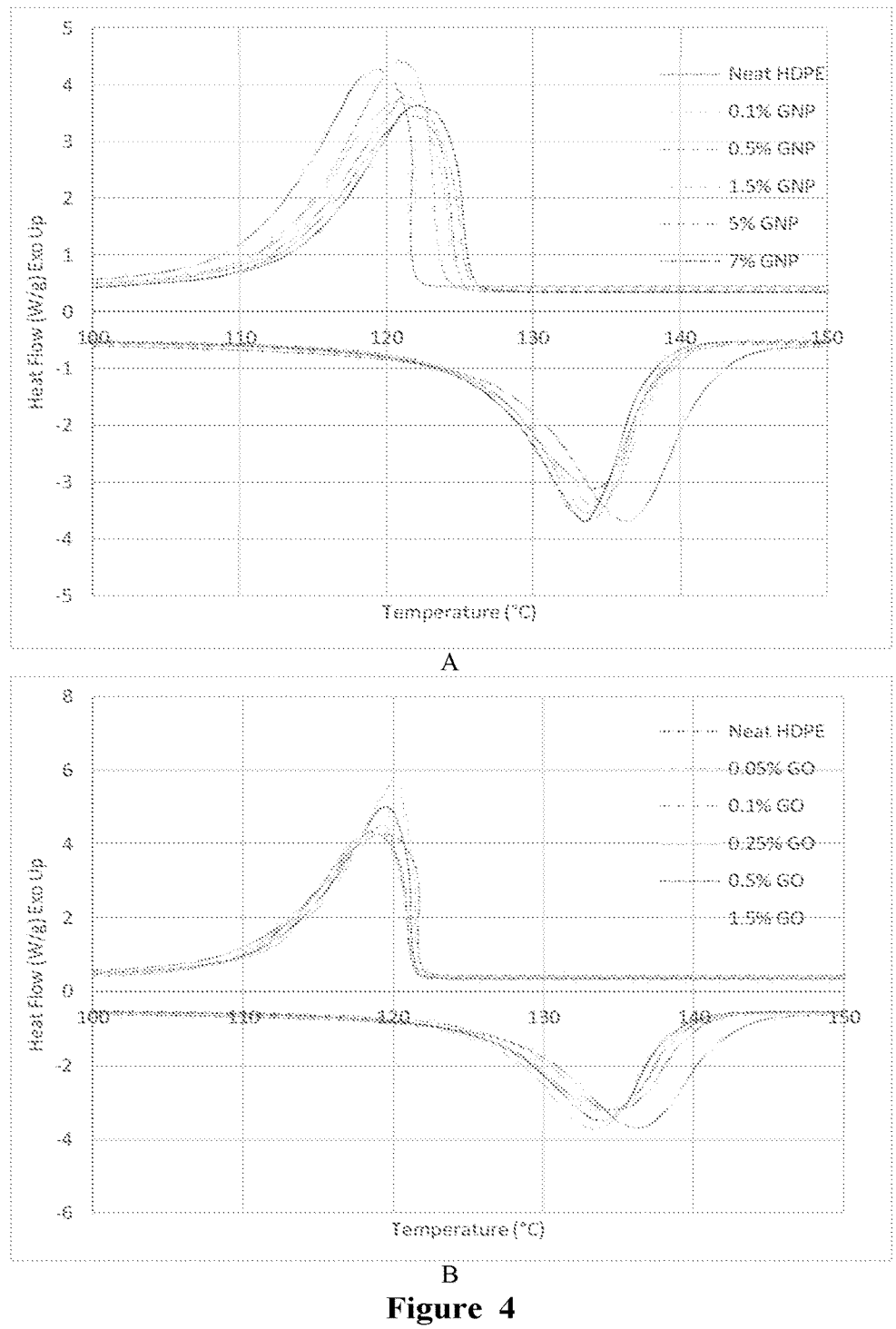
FIG. 4 shows the Differential Scanning calorimetry thermograms for HDPE-GNP and HDPE-GO composites.
Figure 5:
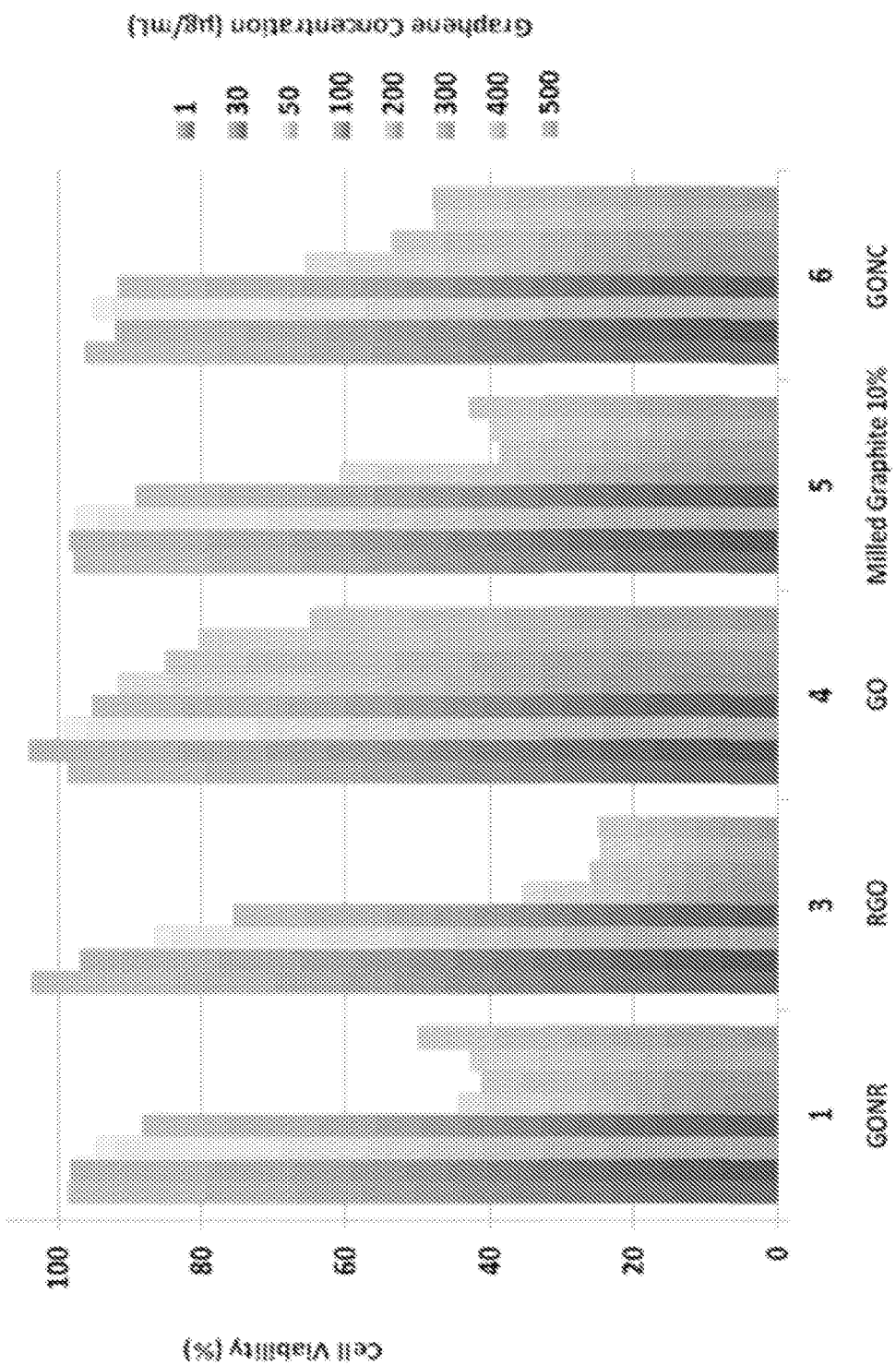
FIG. 5 shows the cell viability results of different graphene derivatives at different concentrations ($\mu g/mL$).

The melt and crystallization behaviour of the HDPE-GNP and HDPE-GO determined by DSC are displayed in FIG. 4 and Table 1.

TABLE 1

Melt and crystallization points, and percent crystallinity for the HDPE-GNP and HDPE-GO composites

| Composition | Melting Temperature (° C.) | Crystallization Temperature (° C.) | Crystallinity (%) |
| --- | --- | --- | --- |
| Neat HDPE | 135.95 ± 0.33 | 119.34 ± 0.32 | 65.12 ± 0.82 |
| 0.1% GNP | 133.69 ± 0.04 | 120.64 ± 0.17 | 56.10 ± 0.39 |
| 0.5% GNP | 134.31 ± 0.26 | 121.31 ± 0.17 | 53.85 ± 0.10 |
| 1.5% GNP | 134.29 ± 0.12 | 120.88 ± 0.28 | 58.35 ± 0.73 |
| 5% GNP | 133.86 ± 0.35 | 121.11 ± 0.02 | 60.00 ± 0.32 |
| 7% GNP | 133.69 ± 0.19 | 122.20 ± 0.01 | 59.97 ± 0.44 |
| 0.05% GO | 134.10 ± 0.04 | 119.00 ± 0.50 | 52.52 ± 1.25 |
| 0.1% GO | 134.61 ± 0.28 | 119.52 ± 0.26 | 55.69 ± 0.97 |
| 0.25% GO | 133.91 ± 0.01 | 118.58 ± 0.29 | 56.46 ± 0.70 |
| 0.5% GO | 133.82 ± 0.06 | 118.92 ± 0.53 | 57.76 ± 0.86 |
| 1.5% GO | 133.57 ± 0.12 | 119.81 ± 0.07 | 58.14 ± 1.73 |

DSC analysis showed a decrease in melting temperature for both the HDPE-GNP composites and the HDPE-GO composites relative to neat HDPE. This phenomenon may be attributed to the disruptive effect that GNP and GO fillers have on the HDPE polymer chains. By restricting polymer chain movement and promoting the formation of smaller crystallites, the addition of fillers slightly reduces the melting temperature of the polymer composite. On the cooling curves, an increase in crystallization temperature was observed in the HDPE-GNP composites, but generally not so for the HDPE-GO composites. The increase can be explained by the tendency of fillers to promote heterogeneous crystal nucleation in polymers, as long as the filler is small enough in size and well-dispersed. In the case of the HDPE-GO composites, agglomeration was present to a greater extent compared to the HDPE-GNP composites and dispersion was inconsistent, in turn leading to fewer nucleation sites. As such, there were no clear trends in crystallization temperature for the HDPE-GO composites tested.

The crystallinity of the composites was computed based on the enthalpy of fusion exhibited during melting in the initial heating curve of the DSC test. The formula used was the following:

$$X_c = \frac{\Delta H_f}{\Delta H_f^o (1 - W_{filler})} \times 100\% \quad (1)$$

where $X_c$ is the degree of crystallinity of the material, $\Delta H_f^o$ is the enthalpy of fusion in melting for a theoretical 100% crystalline HDPE matrix, $\Delta H_f$ is the measured melting enthalpy of the test material obtained by the linear peak integration method in the DSC software, and $W_{filler}$ is the weight fraction of GNP or GO used in the test. From literature, $\Delta H_f^o$ for HDPE was found to be 293 J/g. The crystallinity calculations for the set of composites showed that neat HDPE had the highest crystallinity at 65%, while the composite samples for both the HDPE-GNP and HDPE-GO composites measured between 52% and 60% crystallinity. This phenomenon can again be explained by the tendency of fillers to suppress crystal growth in certain polymer matrices. As neat HDPE already exhibits relatively high crystallinity, the inclusion of GNP or GO serves more to reduce free volume and hinder polymer chain mobility, thus discouraging the formation of larger, more ordered crystals. Nonetheless, the higher filler loading composites generally showed higher crystallinity relative to the lower loadings, due to the difference in nucleation potential arising from an increase in the sheer number of nucleation sites in the composite.

Toxicity of Graphene Oxide Nanoparticles

Different graphene derivatives were compared in a toxicity study. HCT116, a colon cancer cell-line, was selected as the target cells. These cells were incubated with various concentrations of a number of graphene derivatives, notably graphene oxide nanoribbon (GONR), reduced graphene oxide (RGO), a graphene oxide produced (using an acid treatment process) from nanoparticles of the present invention (GO), milled graphite with 10% $CO_2$ uptake and graphene oxide nanocaps (GONCs). These derivatives are different in size, structure and surface functionalities. The results show that all graphene samples become more toxic (less viability %) to the cells by increasing their concentration in the cell medium (µg/mL). However, the GO sample showed the minimum toxicity impact on the cells even at the very high concentrations (400-500 µg/mL). While the typical graphene oxide species, reported in the literature, have been identified to be toxic even at low concentrations of 200 µg/mL, this unique GO has shown the lowest toxicity, which will provide many potentials for biomedical applications. This unique GO was obtained through chemical treatment of a milled graphite (10%).

Zeta of Graphene Oxide Nanoparticles

Zeta potential is a measure of the magnitude of the electrostatic or charge repulsion/attraction between particles, and is one of the fundamental parameters known to affect stability. In fact, it is the electric potential in the interfacial double layer (DL) at the location of the slipping plane relative to a point in the bulk fluid away from the interface. In other words, zeta potential is the potential difference between the dispersion medium and the stationary layer of fluid attached to the dispersed particle. Its measurement brings detailed insight into the causes of dispersion, aggregation or flocculation, and can be applied to improve the formulation of dispersions, emulsions and suspensions. Table 2 below shows the zeta potential values for a wide range of graphene derivatives with different size, structure and functionalities. GO, the graphene oxide produced (using an acid treatment process) from nanoparticles of the present invention, has a Zeta potential of −52 mV and has the highest dispersion stability, while RGO has the lowest stability with a Zeta potential of −22 mV.

TABLE 2

Zeta potential measurements of different graphene derivatives.

| Graphene Name | Particle size | Zeta potential (mV) | Description |
| --- | --- | --- | --- |
| GONR | 200 nm width, 500 nm length | −50 | Graphene oxide nanoribbon |
| RGO | 200 nm lateral size, 5 nm thickness | −22 | Reduced graphene oxide by hydrazine from CUT-GO |
| GO | 200 nm lateral size, | −52 | Graphene oxide from |

TABLE 2-continued

Zeta potential measurements of different graphene derivatives.

| Graphene Name | Particle size | Zeta potential (mV) | Description |
|---|---|---|---|
| | 1 nm thickness | | GNP |
| Milled Graphite 10% | 1 um lateral size, 50 nm thickness | −41 | Milled graphite nanoplatelet |
| GONC | 30 nm lateral size, 1 nm thickness | −44 | Graphene oxide nanocaps |

The invention claimed is:

1. A mechanochemical process to produce exfoliated nanoparticles, said method comprising the step of:
subjecting the material of a solid feedstock in the presence of a gas comprising carbon dioxide to a mechanical agitation operation in a mechanical agitation unit at a pressure of at least 1 atm (15 psi), wherein the solid feedstock comprises an inorganic amorphous powder.

2. A mechanochemical process according to claim 1, wherein said oxidizing gas comprises a gas selected from the group consisting of oxygen, sulfur dioxide, nitrogen dioxide, and combinations thereof.

3. A mechanochemical process according to claim 1, wherein said mechanochemical agitation operation comprises: mixing, stirring, shearing, shaking, blending or ultrasonication.

4. A mechanochemical process according to claim 1, wherein said process further comprises the addition of a catalyst to said solid feedstock.

5. A mechanochemical process according to claim 4, wherein said catalyst comprises a metal oxide selected from the group consisting of iron oxides, cobalt oxides, rhenium oxides, titanium oxides and combinations thereof.

6. A mechanochemical process according to claim 5, wherein the catalyst is added through a lining on an inside wall of the mechanical agitation unit.

7. A mechanochemical process according to claim 1, wherein said process further comprises the step of introducing at least one intercalant agent.

8. A mechanochemical process according to claim 7, wherein said intercalant agent comprises an acid selected from the group consisting of hydrochloric acid, sulfuric acid, nitric acid and combinations thereof.

9. A mechanochemical process according to claim 1, wherein said oxidizing gas comprises carbon dioxide gas emissions derived from industrial processes.

10. A mechanochemical process according to claim 1, wherein said oxidizing gas comprises carbon dioxide at a level within the range of 70-95%.

11. A mechanochemical process according to claim 1, wherein said oxidizing gas comprises carbon dioxide.

* * * * *